Feb. 6, 1962 S. L. SHELDON 3,019,698
PHOTOGRAPHIC METHODS AND APPARATUS FOR
USE IN CAMERAS AND PROJECTORS
Filed April 20, 1953 3 Sheets-Sheet 1
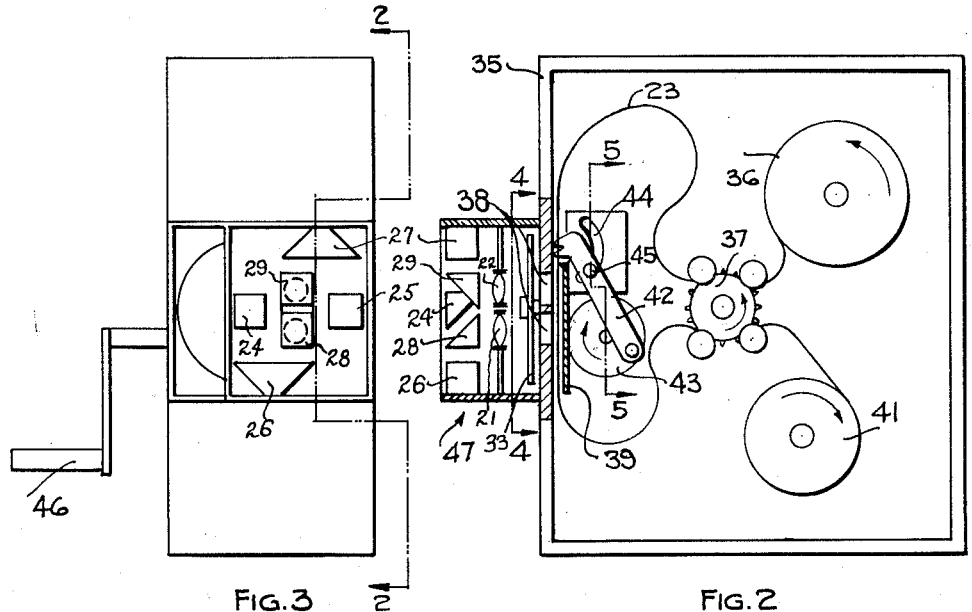
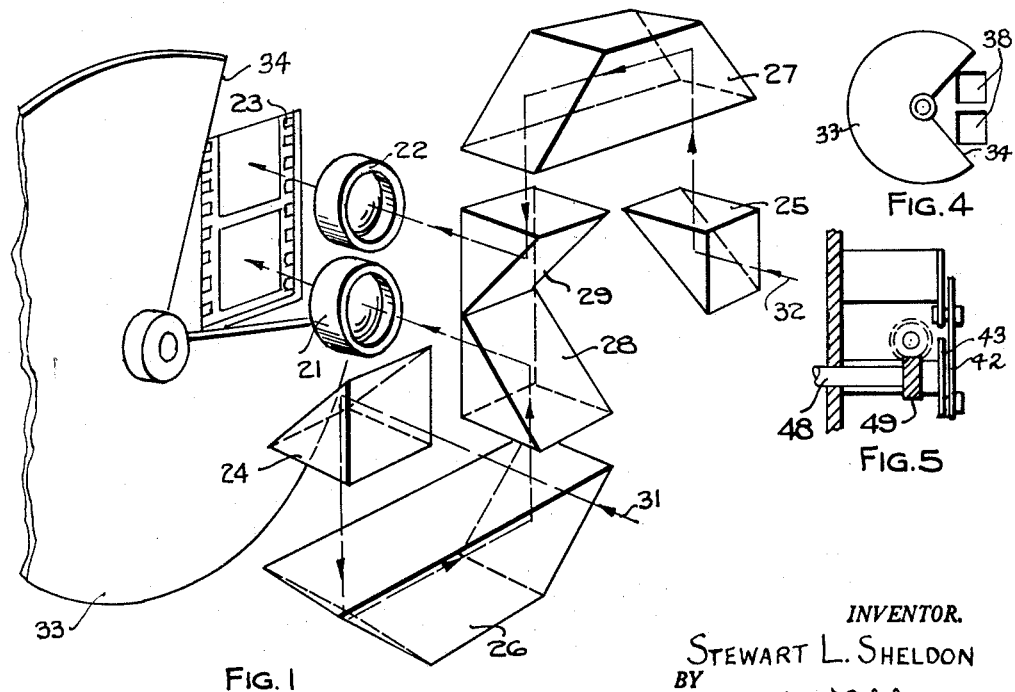
INVENTOR.
STEWART L. SHELDON
BY
Tom Walker Feb. 6, 1962 S. L. SHELDON 3,019,698
PHOTOGRAPHIC METHODS AND APPARATUS FOR
USE IN CAMERAS AND PROJECTORS
Filed April 20, 1953 3 Sheets-Sheet 2

INVENTOR.
STEWART L. SHELDON
BY
Tom Walker

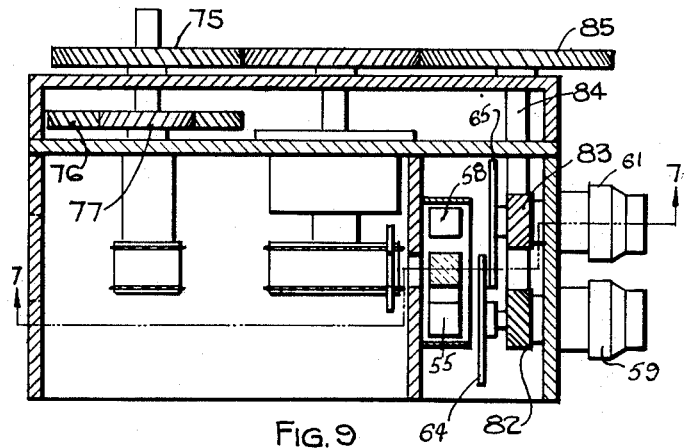
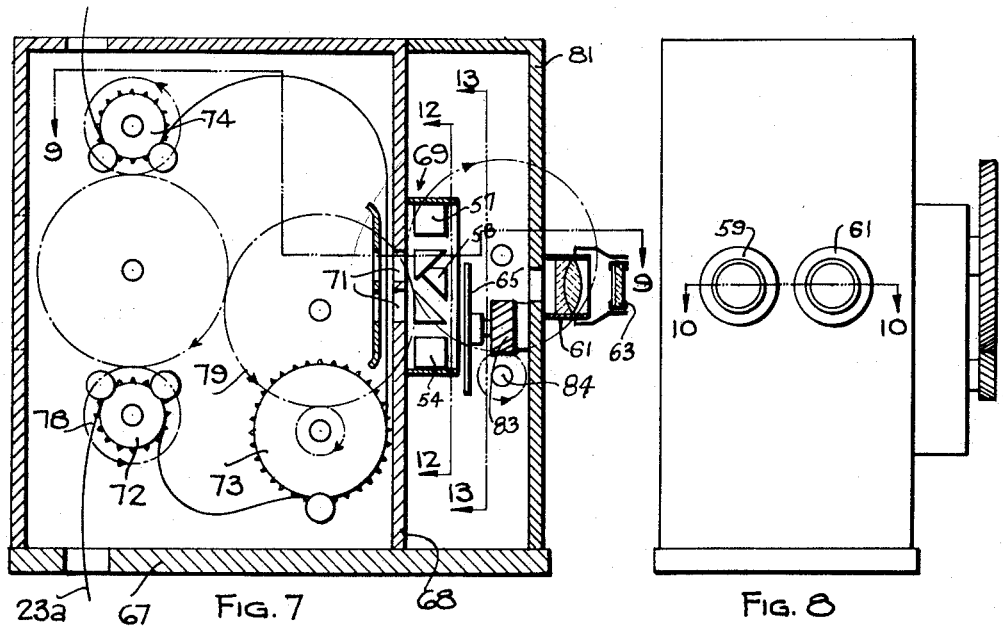
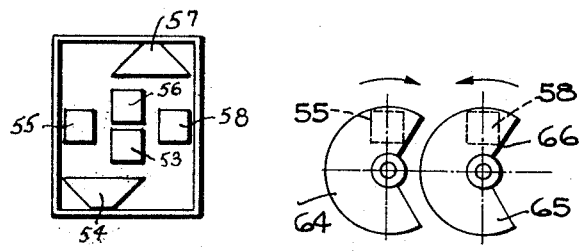

United States Patent Office 3,019,698
Patented Feb. 6, 1962

3,019,698
PHOTOGRAPHIC METHODS AND APPARATUS
FOR USE IN CAMERAS AND PROJECTORS
Stewart L. Sheldon, P.O. Box 197, Trotwood, Ohio
Filed Apr. 20, 1953, Ser. No. 349,640
6 Claims. (Cl. 88—16.6)

This invention relates to photographic methods and apparatus for use in cameras and projectors, and particularly to a system and apparatus resulting in the projection of an image of three dimensional character which can be viewed without the aid of filtering devices or of special viewing surfaces.

The object of the invention is to improve the construction as well as the means and mode of operation of apparatus for deriving three dimensional images, whereby such apparatus may not only be efficient and satisfactory in use, but uniform, accurate and automatic in operation, and having relatively few parts and be unlikely to get out of repair.

A further object of the invention is to take and project still and motion pictures having substantially the depth of natural vision which can be projected on any convenient surface and which can be seen without the aid of special viewing devices.

Another object of the invention is to accomplish the foregoing while retaining the basic structure of the recording and projecting devices using a single camera, a single projector and a single strip of film.

A further object of the invention is to simultaneously record on a single strip of film two images of the same scene and to project such images in such alternating fashion as to convey to the brain of the viewer the impression of a single image having the combined qualities of the two images.

Still another object of the invention is to make use of a standard photographic film in putting the invention into practice, with right and left eye images being recorded on successive frames of the film.

A further object of the invention is to record on, and project from, a single standard photographic film separated eye images.

A still further object of the invention is to introduce a generally new system producing a picture which can be seen and enjoyed even by a person having only one eye.

A further object of the invention is to provide apparatus and the associated method of the character described having the advantageous features, the inherent meritorious characteristics and the mode of operation herein set forth, or their equivalents.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

In the drawings, wherein is illustrated one, but obviously not necessarily the only form of embodiment of the invention, FIG. 1 is a view in perspective, diagrammatically indicating a film recording apparatus and method in accordance with the illustrated embodiment of the invention;

FIG. 2 is a partly diagrammatic view, in side elevation, of a camera constructed in accordance with the diagram of FIG. 1, and taken substantially along the line 2—2 of FIG. 3;

FIG. 3 is a view in front elevation of the camera of FIG. 2;

FIG. 4 is a detail view of the shutter mechanism taken substantially along the line 4—4 of FIG. 2;

FIG. 5 is a detail view of the shutter operating means;

FIG. 7 is a partly diagrammatic view in side elevation of a projector in accordance with the diagram of FIG. 6;

FIG. 8 is a view in front elevation of the projector of FIG. 7;

FIG. 9 is a view in longitudinal section taken substantially along the line 9—9 of FIG. 7;

FIG. 12 is a detail view showing the prism arrangement of the projector, and is taken substantially along the line 12—12 of FIG. 7; and FIG. 13 is a detail view of the shutters in the projector, being taken substantially along the line 13—13 of FIG. 7.

Like parts are indicated by similar characters of references throughout the several views.

Figure 6:
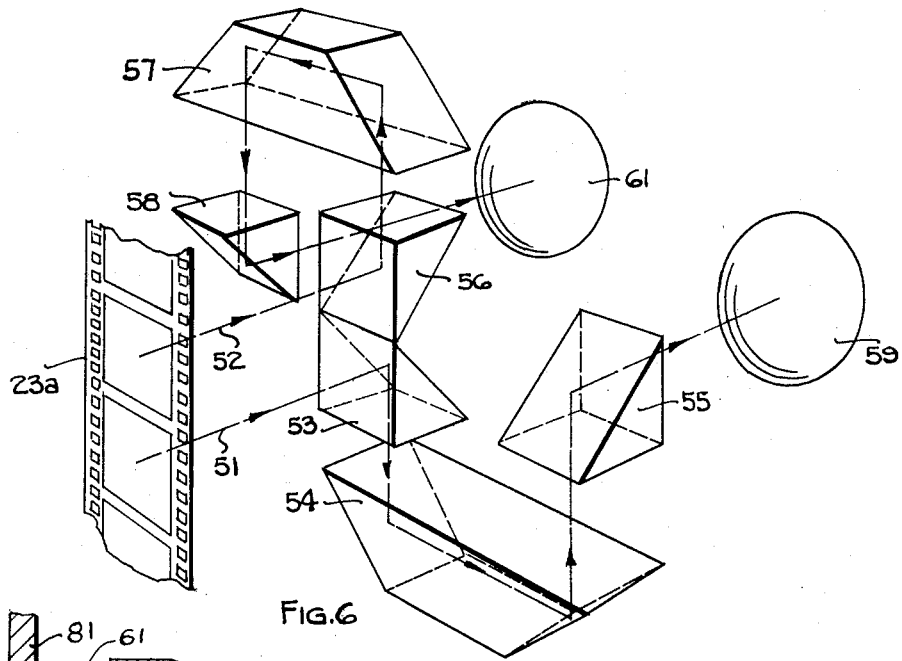
FIG. 6 is a view like FIG. 1, but showing the projection method and apparatus.
Figure 10:
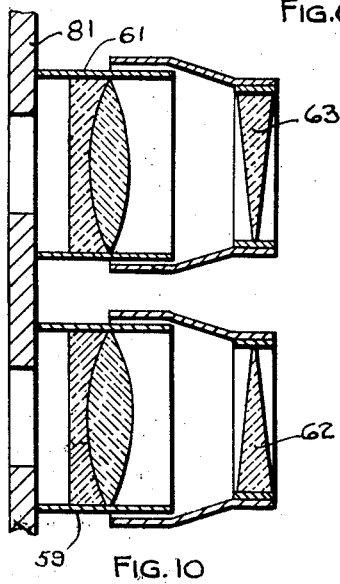
FIG. 10 is a detail view of the projector lenses, taken substantially along the line 10—10 of FIG. 8.
Figure 11:
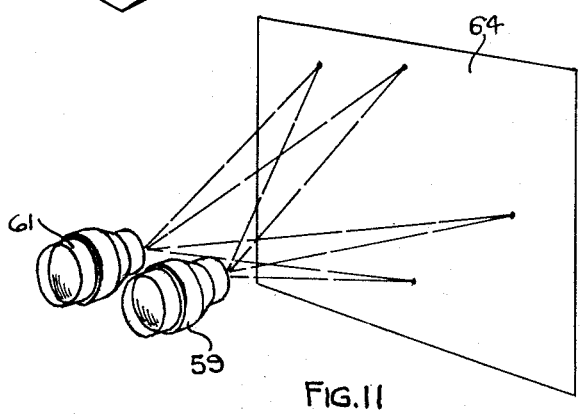
FIG. 11 is a diagrammatic view, in perspective, indicating the superposed relation of the projected images.

Referring to the drawings, a stereoscopic system, in accordance with the invention as illustrated, comprises a picture taking or recording method and apparatus as indicated in FIGS. 1–5 and a picture projecting method and apparatus as indicated in FIGS. 6–13.

As seen in FIG. 1, the recording method contemplates the use of a pair of lenses 21 and 22 in adjacent parallel relation, constructed and arranged to transmit images to successive adjacent frames of a film 23. The lenses 21 and 22 receive pictures corresponding to respective right and left eye images from prisms 24 and 25 spaced apart a predetermined distance, as for example some sixty-five millimeters. From the prisms 24 and 25, the respective images are deflected by other prisms 26, 27, 28 and 29 to the lenses 21 and 22, the paths traveled by the respective images being indicated by the directional arrows 31 and 32. Thus, the image "seen" by the right eye prism 24 is recorded on one frame of the film 23 while the image "seen" by the left eye prism 25 is recorded on the next adjacent frame of the film.

The two successive film frames are exposed simultaneously by a shutter disc 33 having an opening 34 large enough to uncover both frames at one time.

In the illustrative embodiment of the invention, the film 23 is a continuous motion picture film which together with its reels and feeding apparatus is contained in a camera housing 35. As shown, the film strip extends from a supply reel 36 over a sprocket wheel 37, past a position of exposure as defined by spaced apart windows 38 and a backing plate 39, again over the sprocket 37 and finally to another reel 41. Such an installation is a conventional one, as is the provision of a feed claw 42 one end of which is engageable with perforations in the film strip and the other end of which has a crank-like connection to a rotary disc 43, with the claw being controlled in its movements by a cam slot 44 receiving a pin 45 on the claw. It will be understood that the crank disc 43, sprocket 37 and reels 36 and 41 are rotated in a timed relation in an appropriate manner, as from a crank 46.

It will be further understood that the instant invention contemplates a relatively simple modification of the usual motion picture camera and no change in the film, its manner of handling or processing. Thus in the present modified form of camera a lens assembly 47 is substituted for the single lens of the two dimensional camera, a shutter 33 having the larger opening 34 is substituted for the usual shutter, and the operating mechanism for the claw 42 is adjusted to advance the film strip two frames at a time instead of one. The result, as noted, is to expose successive adjacent frames to the light, with the prism and lens arrangement described casting one view of the image "seen" on one frame and casting another view of the image on the other frame. The shutter 33 is operated from the crank 46, or other actuating means, as through a shaft 48 on which is a gear 49. Moving in timed relation to the film advancement devices it exposes two frames of the film 23 while the film is at rest and interrupts the beams cast on the film while the film is being advanced to remove two exposed frames out of recording position and to feed the next two succeeding frames into recording position.

In the projecting system of FIGS. 6–13, the recording system is substantially reversed with the source of light originating in back of the processed film 23 and being cast as separate beams simultaneously through adjacent frames on the film. In passing through the film, the light beams pick up images from the respective frames and direct them along respective lines 51 and 52 through a series of prisms 53—58 in complementary inverse relation to the system of prisms in the recording system.

The separate beams emerge from the prism system following parallel spaced apart paths to lenses 59 and 61 which thus project right and left eye images as recorded on the adjacent frames of the film. The projected images pass through adjustable prisms 62 and 63 mounted on the lenses 59 and 61 and constructed to bend the respective light beams so that the two separate images are fused in a superposed relation on a viewing surface, as the screen 64 of FIG. 8. It will be understood that the lenses 59 and 61 or prisms 53—58 could be constructed so to bend the projected beams but that it is more practicable to provide separate prisms devices for this purpose, or a combination of the two for fine adjustment in the carrying out of such function. The prisms 62 and 63 thus may be adjusted positively to achieve the matching correspondence of projection indicated in FIG. 11 wherein corresponding ray angles of the two lenses 59 and 61 are shown as merging on the surface of the screen 64.

The projection of images is additionally controlled by a pair of shutters 64 and 65 interposed between the prisms 55—58 and the lenses 59—61. The shutters 64 and 65 are in the form of discs of a size to block the transmission of light beams from the prisms 55 and 58 to the lenses 59 and 61 and having cut out portions 66 through which such beams may pass, the portions 66 occupying about 132° of the periphery of each disc. As indicated by the arrows, the shutter discs 64 and 65 rotate in opposite directions. They have, further, such fixed angular relation to one another that the light beams reflected from the prisms 55 and 58 are at no time allowed simultaneously to pass through the lenses 59 and 61. During each cycle of rotation of the discs a sequence of events occurs in which first one and then the othere prism is uncovered and in which for a short period both prisms are covered. More specifically, as seen in FIG. 13, the disc 65 is about to enter an "open" period with respect to prism 58 while disc 64 has entered a "closed" period with respect to prism 55. The open period of prism 66 is about 132° while the closed period of prism 55 is about 228°. There is thus an overlapping period of about 96° once each cycle when both prisms are blacked out. It will be understood that it is in this interval, in motion picture projection, that the film is advanced a double frame space for projection of the next succeeding image.

It will be recognized that the described method and apparatus results in casting alternately upon the viewing surface an image as seen by the right eye and the same image as seen by the left eye, one being withdrawn before the other is seen with the two images being received on the viewing surface in superposed relation. Moreover, one image is replaced by the other in such rapid succession that the eye is not aware of the change and transmits the two pictures to the brain as one.

In the illustrative embodiment of the invention the apparatus for carrying out the described projection method further includes a projector housing 67 having a partition wall 68 on which is mounted a prism assembly 69 including the prism elements 53—58. In the wall 68 is a pair of openings 71 with which successive frames of the film 23 are brought to registry. Within the housing 67 the film 23 is wound over sprocket wheels 72, 73 and 74 and passes in front of the openings 71 through which the images thereon are projected as described. The sprocket wheels 72—74 are positively driven in a timed relation through a gear train 75, 76, 77, 78, and 79 to advance the film strip in successive increments of two frame lengths each.

The gear train as described is mounted on the wall of the housing 67 and on a partly surrounding wall 81, the latter defining an enclosure for the prism assembly 69 and for the shutter discs 64 and 65. The discs 64 and 65 are journaled in the wall 81 and rotated by gears 82 and 83 which are geared to a shaft 84 in turn connected in the gear train 75—79 by a gear 85. The construction and arrangement of parts is such that the shutter and the film feed mechanism operate in a timed relation, with the film at rest during the alternating open periods of the prisms 55 and 58 and being advanced in the aforementioned 96° period of rotation of the shutter discs during which both prisms are closed.

Having thus described my invention, I claim:

1. A photographic method enabling three dimensional projection including the steps of transmitting a pair of spaced images in separate adjacent parallel paths, deflecting said images oppositely, further deflecting said images oppositely, further deflecting said images substantially ninety degrees in substantially parallel paths, then deflecting said images to points aligned substantially at right angles to the common plane of said spaced images, transmitting said images from said points through relatively aligned lenses and deflecting said images to merge in successive timed spaced relation on a screen to simulate three dimensional projection thereby.

2. A photographic method of projection providing three dimensional viewing including the steps of transmitting a pair of spaced images in separate adjacent parallel paths, deflecting said images oppositely along a common axis, further deflecting said images at right angles to said common axis; then deflecting said images to spaced points aligned substantially at right angles to the spaced images, transmitting said images from said spaced points in parallel fashion through relatively aligned lenses and deflecting said images to merge in successive timed spaced relation on a screen to simulate three dimensional projection thereby.

3. In a projector system for projecting three dimensional images on a screen, film having right and left eye images of an objective successively recorded thereon, means engaging the film for successively advancing said film to simultaneously present right and left eye images of the objective at an exposure position, a pair of spaced lenses in a common plane, image deflecting means between the respective images at the exposure position and said lenses for simultaneously separately transmitting the images in respectively parallel paths to the lenses, means mounted between said image deflecting means and said lenses for selectively interrupting the transmission of one or both said images for timed spaced delivery thereof through said lenses and relatively adjustable means connected to the respective lenses for projecting said images to a screen in timed spaced superposed relation to simulate a single image, achieving the impression of depth.

4. A photographic system for achieving three dimensional projection including, a housing, film in said housing mounted for movement from a feed to a take up position having right and left eye images of an object successively imposed thereon, means in said housing defining an exposure position, means engaging with the film in said housing for intermittently presenting right and left eye images on the film at the exposure position, means in said housing for projecting the right and left eye images simultaneously from said exposure position in separate adjacent parallel paths, means mounted to said housing immediately forward of the exposure position interrupting the projection of said images and deflecting them oppositely of along a common axis, further deflecting them at right angles to said common axis and then to spaced points aligned substantially at right angles to the spaced right and left eye images on the film, means for transmitting said images in parallel fashion from said points, lens elements in the path of the transmitted images for directing them in substantially parallel relation and means mounted to said lens elements adjustable to deflect the images to merge in successive timed spaced relation on a screen to simulate three dimensional projection thereby.

5. A system for projecting three dimensional images comprising, a film strip having right and left eye images imprinted thereon in immediately successive relation, means for passing light beams simultaneously through adjacent right and left eye images on said film strip, means providing exposure of adjacent right and left eye images on said film strip at an exposure position, a first pair of prisms immediately forward of said exposure means directly aligned with adjacent images on the strip and receiving the images as transmitted by said light beams on exposure thereof, further prisms vertically and laterally displaced relative said first pair of prisms for respectively receiving the images transmitted therefrom, a pair of lens elements spaced laterally and forwardly of said first prisms, intermediate prisms between said further prisms and said lens elements receiving images from said vertically displaced prisms in parallel paths and axially transmitting them in parallel paths through said lens elements and adjustable means in the path of said lens elements and operatively connected thereto for directing the images to an identical area upon a screen.

6. The structure as set forth in claim 4 and shutter means mounted intermediate said lens elements and said prisms and operable to selectively interrupt one or both said images in successive fashion for time spaced transmission of the images through said lenses and time spaced transmission of the images to the screen, giving the impression of depth of a three dimensional nature thereby.

References Cited in the file of this patent

UNITED STATES PATENTS

| | | |
|---|---|---|
| 1,247,646 | Craig | Nov. 27, 1917 |
| 1,259,365 | Cooper | Mar. 12, 1918 |
| 1,267,689 | Norton | May 28, 1918 |
| 1,477,541 | Clement et al. | Dec. 18, 1923 |
| 2,168,273 | Sauer et al. | Aug. 1, 1939 |
| 2,270,198 | Schensted | Jan. 13, 1942 |
| 2,313,561 | Mainardi et al. | Mar. 9, 1943 |
| 2,403,733 | Mainardi et al. | July 9, 1946 |
| 2,693,128 | Dewhurst | Nov. 2, 1954 |

FOREIGN PATENTS

| | | |
|---|---|---|
| 7,831 | Great Britain | Mar. 28, 1914 |
| 482,360 | Great Britain | 1938 |
| 649,777 | Great Britain | Jan. 31, 1951 |
| 527,256 | France | Oct. 22, 1921 |
| 533,899 | France | Mar. 13, 1922 |
| 542,282 | France | Aug. 8, 1922 |
| 789,755 | France | Nov. 6, 1935 |
| 810,592 | France | Mar. 24, 1937 |